United States Patent [19]
Simmen

[11] Patent Number: 5,413,253
[45] Date of Patent: May 9, 1995

[54] STATIC MIXER

[75] Inventor: Christian Simmen, Mahwah, N.J.

[73] Assignee: Coltene/Whaledent, Inc., Mahwah, N.J.

[21] Appl. No.: 162,859

[22] Filed: Dec. 6, 1993

[51] Int. Cl.$^6$ .............................................. B67D 5/52
[52] U.S. Cl. .................................... 222/137; 222/459; 222/567
[58] Field of Search ............... 222/137, 459, 567, 570, 222/145, 326, 327

[56] References Cited

U.S. PATENT DOCUMENTS

| | | |
|---|---|---|
| 3,143,255 | 1/1963 | Leeds . |
| 3,323,682 | 6/1967 | Creighton . |
| 4,471,888 | 9/1984 | Herb . |
| 4,566,610 | 1/1986 | Herb . |
| 4,687,663 | 8/1987 | Schaeffer . |
| 4,846,373 | 7/1989 | Penn . |
| 4,869,400 | 9/1989 | Jacobs . |
| 4,913,553 | 4/1990 | Falco . |
| 4,974,756 | 12/1990 | Pearson . |
| 4,981,241 | 1/1991 | Keller .............................. 222/137 |
| 4,989,758 | 2/1991 | Keller .............................. 222/327 X |
| 5,038,963 | 8/1991 | Pettengill et al. ............... 222/137 X |
| 5,137,182 | 8/1992 | Keller . |
| 5,228,599 | 7/1993 | Keller .............................. 222/137 |
| 5,333,760 | 8/1994 | Simmen ............................ 222/137 |

FOREIGN PATENT DOCUMENTS 0121342 10/1984 European Pat. Off. .

Primary Examiner—Gregory L. Huson
Attorney, Agent, or Firm—Helfgott & Karas

[57] ABSTRACT

A static mixer for attachment to a cartridge having at least two chambers containing different materials. The static mixer includes an outer sleeve rotatably connected with a center plug. The center plug being positioned inside a collar of the outer sleeve and providing a flow path through the collar to a mixer tube containing a mixer element. The center plug includes hollow male prongs at its connecting end for engagement within outlets in the cartridge leading to the chambers. The outer sleeve having tabs on the outside of the collar for engagement with locking arms on a discharge end of the cartridge when the hollow male prongs on the center plug are placed within the outlets of the cartridge and the outer sleeve is rotated. Prior to use, a closure cap is positioned above the outlets in the cartridge. The closure cap includes passages and a reservoir whereby material within the cartridge may seep through the passages in the closure cap and be collected in the reservoir when parallelizing the pistons within the chambers of the cartridge. This accounts for uneven amounts of material loaded into the chambers upon manufacture. Upon completing an initial use of the cartridge, the static mixer is left attached to the cartridge until the cartridge is needed again. At that time, the static mixer is removed and a new static mixer is connected. The old static mixer, thus, acts as a temporary cap for the cartridge after each use.

17 Claims, 5 Drawing Sheets

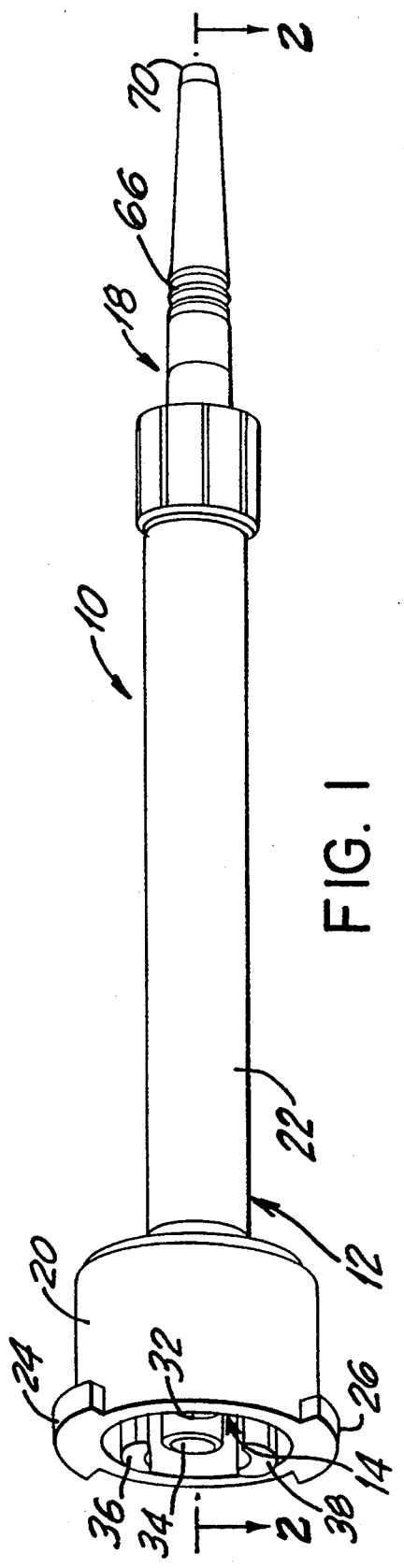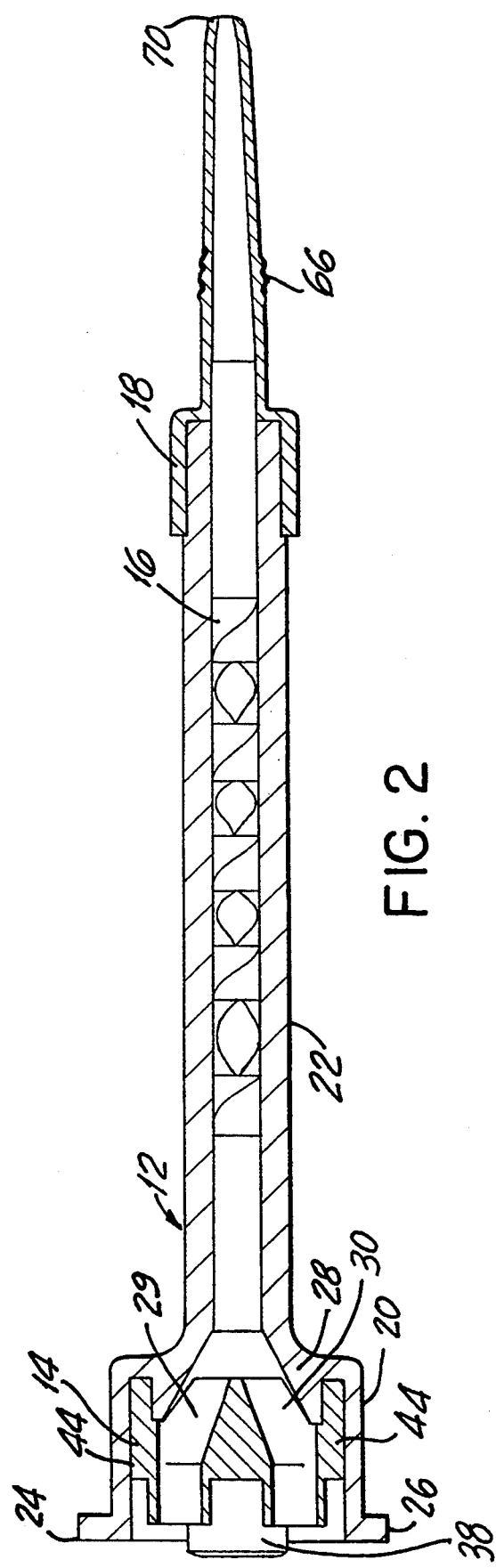

STATIC MIXER

BACKGROUND OF THE INVENTION

1. Field of the Invention

The present invention relates generally to static mixers and, more particularly, to the coupling of a static mixer to a cartridge device.

2. Description of the Prior Art

Static mixers and their connection to cartridge devices in general are well known. Static mixers are adapted for connection to cartridges containing more than one chamber, with each chamber containing a different material. The static mixer receives the materials and mixes them before discharging the mixed materials onto a desired surface. For example, U.S. Pat. No. 5,080,262 issued Jan. 14, 1992, discloses a structure in which two materials are stored in separate chambers in a cartridge. As the materials are extruded from the cartridge, one material is moved into an annular orifice which surrounds a central cylindrical orifice for the other material. A static mixer is provided which screws into the cartridge and has various walls and edges at different levels and of complex shapes required to mate with complementary walls and edges of the coaxial end of the cartridge forming continuations of the annular orifice and the central cylindrical orifice. The complex structure renders this static mixer very expensive and after each use is generally necessary to dispose of the mixer since the materials harden in the mixer.

U.S. Pat. No. 4,767,026 issued Aug. 30, 1988, describes a mixer having a double walled baffle positioned in a common orifice to keep the materials from the cartridge separated as they are extruded into the mixer. Mixing in this device takes place at the end of the baffle which is at the end of the cartridge. Typically, after extrusion for a particular use is completed, the static mixer is retained as a cap until the next use. However, since there is no particular structure to keep the materials from mixing at the end of the baffle, the backcuring of the materials upstream of the static mixer will cause the materials to harden and the cartridge will have to be discarded together with any unused materials.

Upon manufacture and prior to use with a static mixer, a closure cap is used to cover the cartridge. The closure cap prohibits the extrusion of materials from the cartridge prior to initial use. An example of a closure cap is described in U.S. Pat. No. 5,137,182 issued Aug. 11, 1992. This patent discloses a closure cap for the nozzle orifice of a dispensing cartridge. This cap has a base including a number of stoppers projecting from the base. The stoppers each have a number of fillets spaced along their length with one fillet at the junction between the stopper and the base. The stoppers fit into the orifices of a dispensing cartridge forming a pressure seal. The base also has anchoring devices projecting from its sides for securing to the cartridge.

U.S. Pat. No. 3,506,157 issued Apr. 14, 1970 discloses a two piece closure cap. This cap includes an inner piece having two prongs for placement within the bores of a cartridge and a rotatable portion having threads on an inner side thereof. The cap screws onto the neck of the container. Another type of closure device is described in U.S. Pat. No. 3,143,255 issued Aug. 4, 1964. This device includes a deformable plug member which engages an opening in the wall of the container. The plug contains a passageway allowing for the container contents to be dispensed when in an open position, and blocked when in a closed position. Finally, U.S. Pat. No. 4,974,756 issued Dec. 4, 1990 discloses a dispensing container and cap assembly. The cap includes two protrusions for orienting the cap so that each closure portion contacts the same outlet each time the cap is coupled to the container.

While each of the caps are useful, it is desirable to have a single coupling arrangement on the cartridge which would connect to both a static mixer and also for connection to a closure cap. The connection must keep material from the cartridge chambers separate from each other until they reach the static mixer. The static mixer will then combine the materials in the correct proportions. The connection between the static mixer and cartridge is needed which also provides a tight fit not allowing material to smear between the static mixer and cartridge. Also needed is a way of capping the cartridge prior to use with the static mixer to account for uneven amounts of material within the chambers of the cartridge and for parallelizing the plungers within the chambers.

It is, therefore, needed to produce a dispenser which solves the aforementioned problems and provides improvements over the presently known connections between static mixers and cartridges.

SUMMARY OF THE INVENTION

It is accordingly, an object of the present invention to provide a static mixer having an inner plug rotatably mounted within an outer sleeve for delivering material from a cartridge to a mixer element.

It is another object of the present invention to provide a static mixer which, in operation, is bayonet locked to a cartridge.

It is a further object of the present invention to provide a closure cap for covering the cartridge prior to use wherein the closure cap includes a reservoir to collect excess material from the chambers when parallelizing the plungers.

It is a still further object of the present invention to provide tabs at the connecting end of the outer sleeve of the static mixer for engagement with locking arms on the dispensing end of the cartridge for locking the static mixer to the cartridge.

An even further object of the present invention is to provide a key plug connection between the static mixer and the cartridge for added stability in the connection and preventing male prongs inserted into famale outlets in the cartridge from shearing off under torque applied when engaging and disengaging the static mixer.

The present invention includes a static mixer having a center plug, an outer sleeve having a collar and mixer tube, and a mixer element. The center plug includes hollow male prongs having passageways extending therethrough and continuing through the center plug. There are also provided positioning keys on the center plug. The hollow male prongs are received within respective female outlets in the cartridge. The center plug is rotatably secured within the collar. The collar is connected to the mixer tube and includes tabs projecting outwardly at its connecting end. The static mixer is adapted for connection to the dispensing end of a cartridge having a female outlet from each chamber. A recess is formed between the female outlets having a keyway at both ends thereof for receiving the positioning keys. Locking arms are provided on the sides of the dispensing end of the cartridge for engagement with the projecting tabs.

A closure cap is also included for covering the cartridge upon manufacture. The closure cap is in the shape of a hollow cylinder having a shelf spanning the inside diameter thereof and dividing the cylinder into two sections. The shelf has two sealing plugs and two passages defined by cylindrical walls extending from one side thereof, and is formed to provide a reservoir on another side thereof.

Upon manufacture and for shipment of the cartridge, the closure cap is positioned so that the sealing plugs are seated in the female outlets and the cylindrical walls are positioned within the keyways in the cartridge. Prior to use with the static mixer, the closure cap is removed from its initial position on the cartridge and rotated 90°. The cylindrical walls defining the passages are then engaged with the female outlets and the sealing plugs fit into the keyways. A dispenser, to which the cartridge is attached, is then slightly pumped to allow material within the cartridge to flow through the passages and into the reservoir in the closure cap. This is done until the material within the cartridges are parallelized. Parallelizing the material means evening the pistons in relation to the material in the chambers so that, when the dispenser is subsequently used with the static mixer, an even amount of material exits in each chamber.

The static mixer is connected to the cartridge by placing the hollow male prongs of the center plug within the female outlets in the cartridge and the positioning keys in the keyways. The collar is then rotated bayonet style until the tabs are engaged with the locking arms.

In use the material is delivered from the chambers of the cartridge, through the hollow male prongs and continuing through the passageways in the center plug. The materials then enter into the mixer tube where they are mixed by the mixer element and discharged outside the static mixer for use.

Upon completion of use, the static mixer is left attached to the cartridge until the next time use of the cartridge is desired. At that time, the static mixer is removed by rotating the collar in the opposite direction thereby releasing the tabs from engagement with the locking arms, and then pulling the hollow male prongs out from within the female outlets of the cartridge. A new static mixer is then connected to the cartridge.

The aforementioned objects, features and advantages of the invention will, in part, become obvious from the following more detailed description of the invention, when taken in conjunction with the accompanying drawings, which form an integral part thereof.

BRIEF DESCRIPTION OF THE DRAWINGS

FIG. 1 is a perspective view of the static mixer of the present invention;

FIG. 2 is a view of the static mixer of the present invention taken along the line 2—2 of FIG. 1;

DETAILED DESCRIPTION OF THE PREFERRED EMBODIMENT

Referring now to FIGS. 1 and 2, there is shown the static mixer of the present invention. The static mixer is illustrated generally by the number 10.

Figure 7:
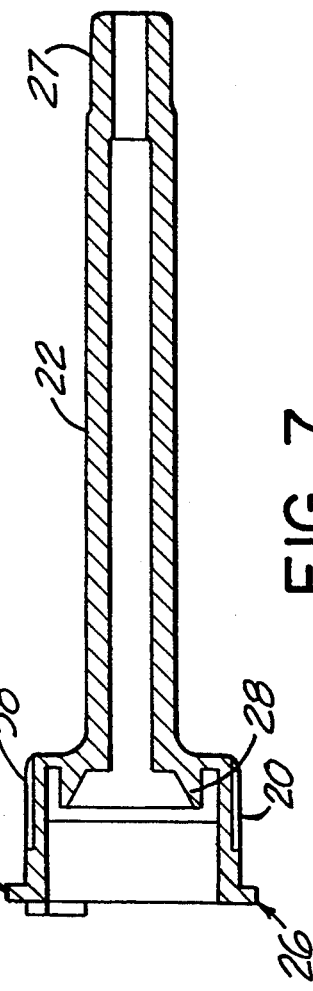
FIG. 7 is a detailed view of the outer sleeve as shown in FIG. 2.
Figure 13:
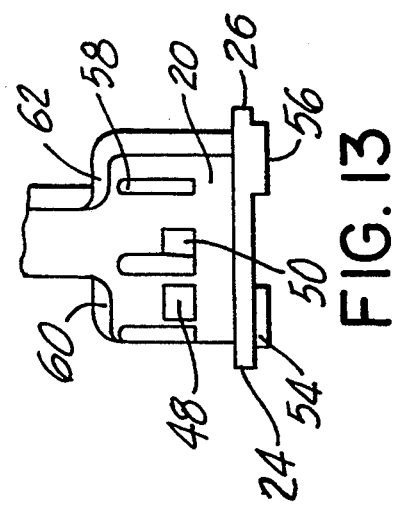
FIG. 13 is a perspective view of the exterior of the collar of the outer sleeve of the present invention.
Figure 12:
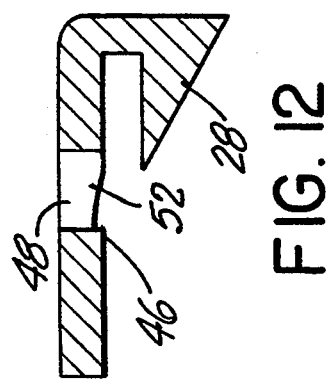
FIG. 12 is a view of the ledge provided within the collar of the outer sleeve.

The static mixer 10 comprises an outer sleeve 12, a center plug 14, and a mixer element 16. The static mixer 10 may also include an oral or bite tip 18. The outer sleeve 12 is cylindrical in form having an enlarged collar 20 at its connecting end and narrowing into an elongated mixer tube 22. Both the collar 20 and the mixer tube 22 are hollow, as can be seen in FIG. 7. Interiorly, at the junction between the collar 20 and mixer tube 22 is a slanted protrusion 28, around a base of the mixer tube 22 and extending into the hollow collar 20. Extending through the collar 20, near the connecting end, are two square apertures 48, 50, as can be seen in FIGS. 12 and 13. Defining the base of each aperture 48, 50, the base of the aperture being the side closest to and extending parallel to the connecting end of the collar, are respective ledges 46 for retaining the center plug 14 in position within the collar 20. Extending around an interior of the collar 20 at a position even with the apertures 48, 50 is a slight indentation 52, as shown in FIG. 12.

Referring now to FIG. 13, the connecting end of an outside wall of the collar 20 are extending tabs 24, 26 on opposite sides thereof. On a base of each extending tab 24, 26 is a foot stop 54, 56. The foot stops 54, 56 stop rotation of the collar 20 when the tabs 24, 26 are engaged with respective locking arms on the cartridge. Also on an outside wall of the collar 20 are narrow grips 58 cut into the collar 20 for aiding in rotation of the collar 20. Two bars 60, 62 also extend along the length of the collar 20 and are on opposite sides thereof. These bars 60, 62 are also for aiding the user in rotating the collar 20. The distal end of the mixer tube 22 has a number of evenly spaced rings 27 each extending around the outside diameter of the mixer tube 22, as can be seen in FIG. 7.

Rotatably mounted within the collar 20 is the center plug 14. The center plug 14, as shown in FIGS. 3–6, is solid and of a diameter substantially equal to the inner diameter of the collar 20. The center plug has a base wall 68 on which are projecting two hollow male prongs 32, 34. Passageway 29, 30 extend through the prongs parallel to each other. The passageways continue part way into the center plug 14. At this point, the passageways 29, 30 angle towards each other, extending at this angle through the rest of the center plug 14. At this interior end of the plug 14, the passageways 29, 30 are separated by a divider 64. The hollow male prongs 32, 34 are slightly tapered at their distal ends for a snug fit within female outlets in the cartridge. The hollow male prongs 32, 34 are circular in shape as are the passageways 29, 30 at the base wall 68.

Figure 3:
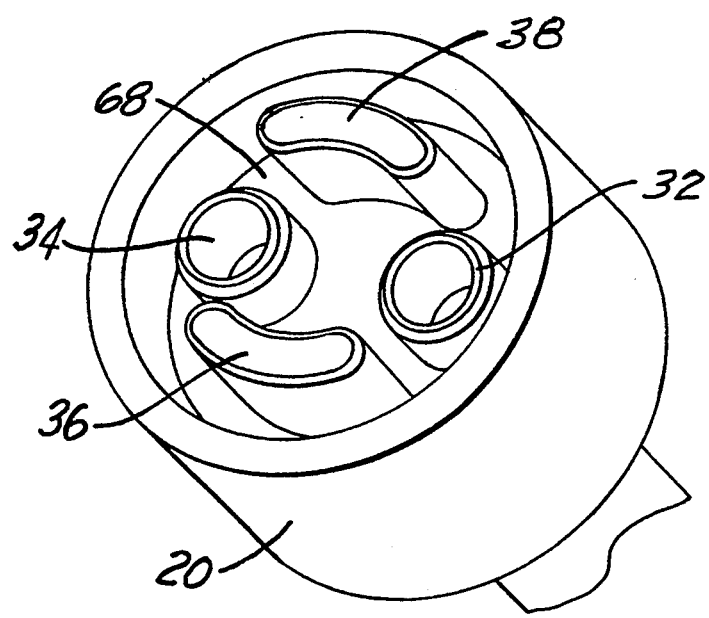
FIG. 3 is a perspective view of the center plug within the collar.
Figure 4:
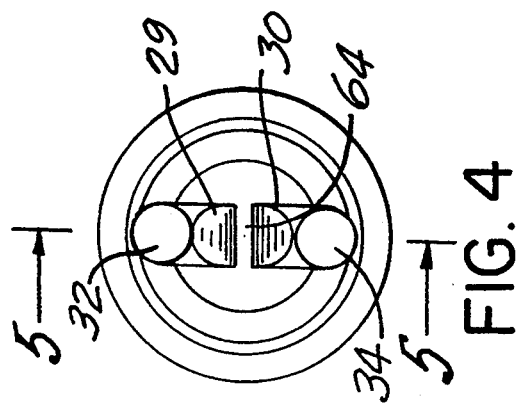
FIG. 4 is a detailed view of the center plug taken from an inner end thereof and looking toward the coupling end.
Figure 5:
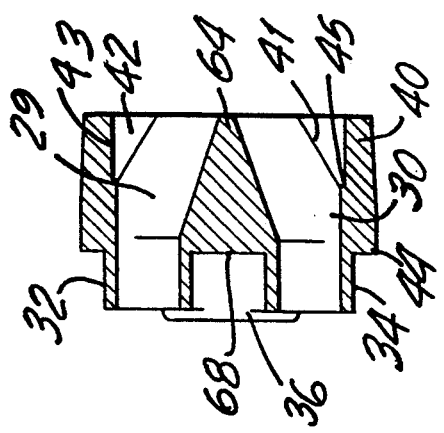
FIG. 5 is a detailed view of the center plug cut along the line B—B of FIG. 4.
Figure 6:
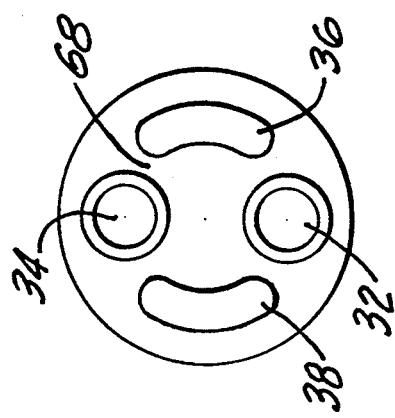
FIG. 6 is a view of the center plug looking in from the coupling end.

Also projecting from the base wall 68 of the center plug 14 are two keys 36, 38. The keys 36, 38 are diametrically opposed from each other, between the two hollow male prongs 32, 34. Referring now to FIG. 5, extending around the interior end of the center plug 14 is a skirt 40. The skirt 40 extends entirely around the interior end of the center plug 14. The skirt 40 is separated from the passageways 29, 30 by an angled trough 42. The trough 42 is defined by a first wall 41 which extends from the interior end of the center plug 14 along the walls of the passageways 29, 30 until a point slightly removed from the base of the skirt 40. The trough 42 is further defined by a second wall 43 which forms part of the skirt 40 to a depth equal to that of the first wall 41. A third connecting wall 45 extends between the first and second walls 41, 43 to further define the trough 42.

The divider 64 extends across the diameter of the trough 42 in the form of a thin bar. The passageways 29, 30, at the interior end of the center plug are each in the form of a modified semicircle, each passageway being on opposite sides of the divider 64. The modified semicircular form of each of the passageways 29, 30 at the interior end of the center plug 14 has their straight edge abutting the divider 64. The passageways 29, 30 therefore are circular in shape at the connecting end of the center plug 14 and blend into a partial semicircular shape at the interior end of the center plug 14. This shape at the interior end of the plug 14 allows for a precise fit with the circular opening in the center of the mixer tube 22 of the outer sleeve 12. Slightly removed from the connecting end of the center plug 14, is a protrusion 44 extending around the outside wall of the center plug 14 for mating with the two ledges 46 of the collar 20. The protrusion 44 is inwardly tapered toward the interior end of the center plug 14 so it may slide easily into the collar 20 and rest extending into the indentation 52.

The center plug 14 is positioned within the collar 20 of the outer sleeve 12. The slanted protrusion 28 extending into the collar 20 is adapted to be received in the trough 42 of the center plug 14. To retain the center plug 14 in its position within and in a rotatable relationship with the outer sleeve 12, the protrusion 44 around the outer side of the center plug 14 is placed in a position locked behind the ledges 46 and within the indentation 52. Since there are no securing contacts between the outer sleeve 12 and the center plug 14, the outer sleeve 12 can be rotated without rotating the center plug 14. There does, although, exist a frictional sealing area 72 between the center plug 14 and the collar 20. The frictional sealing area 72 is between a side of the rim 40 opposite the trough 42 and an inner side of the collar 20. This sealing area 72 further aids in rotatably securing the center plug 14 within the collar 20.

Within the mixer tube 22 of the outer sleeve 12 is a mixer element 16, as can be seen in FIG. 2. The mixer element 16 is not secured or welded in any manner within the mixer tube 22. The inlet baffle of the mixer element 16 is freely positioned in random rotational orientation relative to the cartridge exit but is frictionally secured in its position within the mixer tube 22. The mixer element 16 is made out of any type of thermoplastic material. Furthermore, the mixer element 16 is of conventional design. For further details regarding the mixer element reference is made to U.S. Pat. Nos. 4,840,493 and 4,850,705, by way of example.

Attached to the distal end of the mixer tube 22 is the oral tip 18, as can be seen in FIGS. 1 and 2. The dispensing end of the oral tip 18 is slightly tapered to be narrower than the mixer tube 22 and extends outward past the distal end of the mixer tube 22. The intake end of the oral tip 18 is placed over the rings 27 at the distal end of the mixer tube 22. The rings 27, shown in FIG. 7, serve to retain the oral tip 18 in a locking arrangement. The inside diameter of the intake end of the oral tip 18 is of such size that a pressure fit with the rings 27 is accomplished. The oral tip 18 is made of flexible material. Along a mid section of the oral tip 18 are serrations 66. The serrations 66 allow for bending of the oral tip 18 so that material exiting the static mixer 10 may be placed precisely for more effective use.

Figure 9:
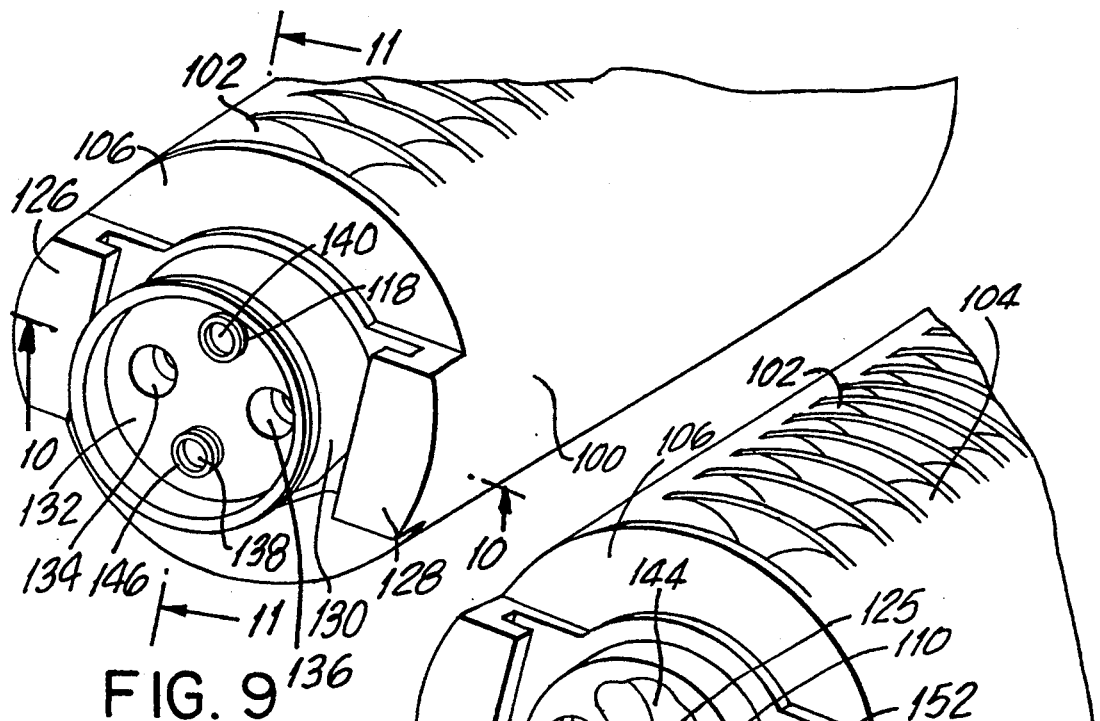
FIG. 9 is a perspective view of the cartridge and closure cap in engagement with each other.
Figure 8:
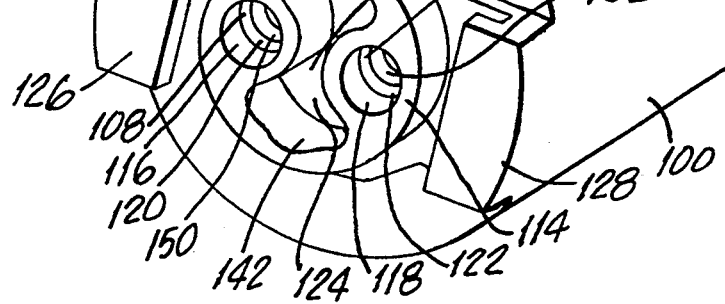
FIG. 8 is a perspective view of the dispensing end of the cartridge of the present invention.

A cartridge 100, to which this static mixer 10 can be attached, will now be described with reference to FIGS. 8 and 9. The cartridge 100 contains two chambers 102, 104 each retaining a different material such that, when the two materials combine, they harden. At the dispensing end 106 of the two chambers 102, 104 are female outlets 108, 110, one outlet for each chamber. A raised circular boss 114 extends outward from the cartridge 100 in a central area and includes therein the female outlets 108, 110. The female outlets 108, 110 extend further into the dispensing end of their respective chamber 102, 104 to define dispensing holes 150, 152. The female outlets 108, 110 in the circular boss also have interior walls defining circular openings 116, 118. The circular openings 116, 118 in the circular boss 114 have a diameter which is larger than the diameter of the dispensing holes 150, 152 at the chambers 102, 104. Because of these dimensions, a step 120, 122 is formed between each of the respective pairs of circular openings and dispensing holes 116, 150 and 118, 152. These steps 120, 122 are tapered inwardly towards the chambers 102, 104.

Extending between the female outlets 108, 110 in the circular boss 114 is an elongated recess 124 in the shape of an hourglass configuration. This recess 124 extends perpendicular to a plane connecting the female outlets 108, 110. The recess 124 has a narrow portion 125 extending between the female outlets 108, 110 and widens at either side of the female outlets 108, 110 to define keyways 142, 144. Also extending from the dispensing end 106 of the cartridge 100 are two locking arms 126, 128. The locking arms 126, 128 are positioned on opposite sides of the circular boss 114, one on each side.

Figure 11:
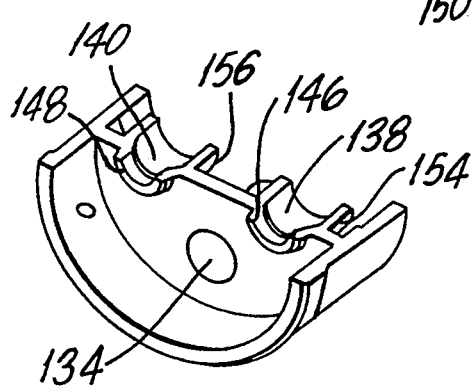
FIG. 11 is a perspective view of the closure cap of the present invention taken along the line B—B of FIG. 9, perpendicular to the view in FIG. 10.
Figure 10:
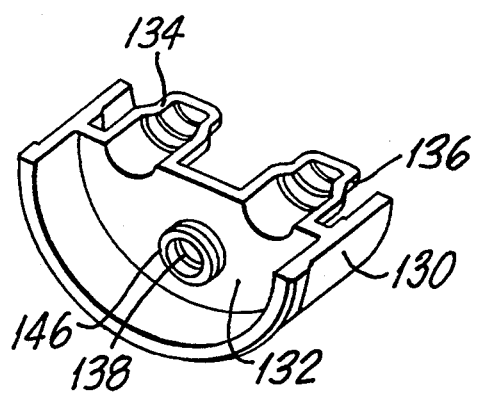
FIG. 10 is a perspective view of the closure cap of the present invention taken along the line A—A of FIG. 9.

The present invention also includes a closure cap 130, as shown in FIGS. 10 and 11. The closure cap is for engagement with the cartridge 100 when sealing the cartridge for shipping and, thereafter, before use, for parallelizing the plungers within the cartridge 100, evening out the amount of material within each chamber 102, 104 of the cartridge 100. The closure cap 130 is substantially circular and of substantially the same the diameter as the circular boss 114 to mate onto the circular boss 114. The closure cap 130 is in the shape of a cylinder having a shelf 132 separating the ends of the closure cap 130. The position and shape of the shelf 132 together with the surrounding cylinder wall defines a reservoir within the cap 130. Extending from the shelf 132 on the side opposite the reservoir are two sealing plugs 134, 136. The sealing plugs 134, 136 are on opposing ends of the same side of the shelf 132 from one another and extend away from the reservoir. The outside shape of the sealing plugs 134, 136 resembles the shape of the female outlets 108, 110 into the cartridge 100. When the closure cap 130 is placed on the cartridge 100 prior to preparation for use, the sealing plugs 134, 136 are positioned so that they fit securely within the female outlets 108, 110 in the cartridge 100. At their connection with the shelf 132, the sealing plugs 134, 136 have an outside diameter equal to the diameter of the circular openings 116, 118. They extend into the cartridge at this same diameter for a distance equal to the depth of the circular openings 116, 118. The sealing plugs 134, 136 then taper to an outside diameter equal to that of the dispensing holes 150, 152 in the cartridge 100. The taper in the sealing plugs 134, 136 mirrors that of the steps 120, 122. The sealing plugs 134, 136 are closed at their base.

Also extending through the shelf 132, parallel to the sealing plugs 134, 136, are two cylindrical walls 138, 140 defining passages therein. At the opposing side of the cylindrical walls 138, 140 is a rim 146, 148 formed onto the shelf 132. The rims 146, 148 each surround the edge of a respective passage on the side of the shelf 132 defining the reservoir. The walls 138, 140 are also diametrically opposed from each other such that a plane connecting the walls 138, 140 would be perpendicular to a plane connecting the sealing plugs 134, 136. The walls 138, 140 do not extend as far from the shelf 132 as the sealing plugs 134, 136. They only extend a distance equal to the depth of the circular openings 116, 118 so as to contact the steps 120, 122 when placed in the female outlets 108, 110. When the cap 130 is placed on top of the cartridge 100 prior to preparation for use, the walls 138, 146 defining the passages extend into the keyways 142, 144 in the circular portion 114.

In operation, the cap 130 is initially placed atop the circular boss 114 of the cartridge 100 when manufactured. The sealing plugs 134, 136 are positioned within respective female outlets 108, 110 in the circular boss 114. The cartridge 100 is then loaded into a dispensing device. The cap 130 is removed from engagement with the cartridge 100 and replaced after it is rotated 90°. When the cap 130 is replaced on the cartridge 100, the walls 138, 140 defining the passages are now positioned within respective female outlets 108, 110 and the sealing plugs 134, 136 are positioned in the keyways 142, 144 of the elongated recess 124. At this time, since the chambers 102, 104 in the cartridge 100 may not normally be equally filled with material, a trigger on the dispensing device is slightly pumped to release some material from the cartridge 100 through the passages defined by the cylindrical walls 138, 140. This material is collected in the reservoir. The trigger is pumped until material from each chamber 102, 104 flows through the passages and into the reservoir. At this point it can be determined that the chambers 102, 104 are equally filled and the pistons within the chambers 102, 104 have thus been parallelized.

The cap 130 is then removed and the static mixer 10 is placed in contact with the cartridge 100. The hollow male prongs 32, 34 of the center plug 14 are placed inside the female outlets 108, 110 of the circular boss 114. The length of the hollow male prongs 32, 34 are such that, when positioned fully within the female outlets 108, 110, they press snugly against the steps 120, 122. The tapering of the hollow male prongs 32, 34 aids in the snug fit with the tapered steps 120, 122. The hollow male prongs 32, 34 should fit snugly against the steps 120, 122 to prevent the material in each chamber from leaking out between the female outlets 108, 110 and hollow male prongs 32, 34. If the material leaks out, it will smear at the outlet of the cartridge 100 allowing the materials to mix and harden. The hardened material will also block the female outlets 108, 110 of the cartridge 100 prohibiting re-use of the cartridge 100. The keys 36, 38 are positioned within respective keyways 142, 144 of the elongated recess 124.

At this point, the outer sleeve 12 is rotated so that the tabs 24, 26 are engaged with the locking arms 126, 128 of the cartridge 100. The outer sleeve 12 is rotated until the foot stops 54, 56 are in a flush position against the base of a respective locking arm 126, 128. Because the center plug 14 is positioned in a rotatable relationship with the outer sleeve 12 and is held stationary by its positioning within the female outlets 108, 110, the position of the center plug 14 is not disturbed by the rotation of the outer sleeve 12 into an engaged position with the locking arms 126, 128. The static mixer 10 and the cartridge 100 are thus connected together by a bayonet-type locking device.

Using a dispenser, the material needed is dispensed from the cartridge 100 through the passageways 29, 30 in the center plug 14 and into the mixer tube 22. The mixer element 16 within the mixer tube 22 mixes the materials together and the mixed materials are forced through the oral tip 18. The static mixer 10 is left attached to the cartridge 100 until it is desired to use the materials in the cartridge 100 again. At this time, the static mixer 10 is removed. This is accomplished by turning the outer sleeve 12 in the opposite direction so that the tabs 24, 26 are no longer engaged with the locking arms 126, 128. The static mixer 10 may now be lifted from its position of engagement with the cartridge 100. Once the static mixer 10 is removed from the cartridge 100, a new static mixer 10 is positioned atop the cartridge 100 in the same manner as the previous static mixer 10.

It is to be understood that the static mixer of the present invention is not limited to use with a cartridge containing only two separate materials but can be adapted for use with cartridges containing two or more separate materials. The discussion and drawings illustrating use with a cartridge containing two chambers is for purposes of example only and not to limit the invention.

There has been disclosed heretofore the best embodiment of the invention presently contemplated. However, it is to be understood that various changes and modifications may be made thereto without departing from the spirit and scope of the invention.

I claim:

1. A static mixer for mixing together at least two materials from a cartridge, comprising:
    an elongated hollow sleeve having an enlarged collar at one end thereof and a mixer tube at a second end thereof;
    coupling means positioned with respect to the collar;
    a center plug, rotatably mounted within the collar of the sleeve, having hollow male prongs extending at a connecting end of the center plug and passageways extending through the prongs and the plug, each passageway having an exit at the mixer tube, and each prong being adapted to engage a respective outlet on a discharge end of the cartridge;
    a mixing element positioned within the mixer tube portion; and means for rotatably positioning the sleeve into locking engagement with the cartridge.

2. A static mixer as claimed in claim 1, wherein the collar comprises a ledge extending into the interior thereof and the plug further comprises a protrusion extending around an exterior thereof, such that the protrusion of the plug is rotatably captured within the collar by the ledge.

3. The static mixer of claim 2, wherein the collar further includes an indentation extending around the interior thereof and having a base side even with the ledge, and the protrusion extending around the plug includes tapered sides extending inward towards an interior end of the plug wherein the tapered sides facilitate insertion of the plug into the collar and mating with the indentation around the interior of the collar.

4. The static mixer as claimed in claim 1, wherein the center plug further includes at least two keys extending parallel to the hollow male prongs for engagement within mating keyways in the discharge end of the cartridge.

5. The static mixer as claimed in claim 1, further comprising an oral tip connected to a distal end of the mixer tube.

6. The static mixer as claimed in claim 5, wherein the mixer tube includes a plurality of spaced rings around an outside of its distal end allowing the oral tip to be connected to the mixer tube by a pressure fit.

7. The static mixer as claimed in claim 6, wherein the oral tip includes serrations around a mid section thereof allowing the oral tip to bend.

8. The static mixer of claim 1, wherein the coupling means includes tabs positioned at a coupling end of and extending from an exterior side of the collar for rotational bayonet locking engagement with locking arms on the discharge end of the cartridge.

9. In combination, a static mixer and a cartridge, wherein the static mixer comprises:
an elongated hollow sleeve having an enlarged collar at one end thereof and a mixer tube at a second end thereof;
coupling means positioned with respect to the collar;
a center plug, rotatably mounted within the collar of the sleeve, having hollow male prongs extending at a connection end of the center plug and passageways extending through the prongs and plug, each passageway having an exit at the mixer tube, and each prong being adapted to engage a respective outlet on a discharge end of the cartridge;
a mixing element positioned freely within the mixer tube; and
means for rotatably positioning the sleeve for coupling with the cartridge; and wherein
the cartridge comprises:
at least two chambers, each of the at least two chambers including an outlet at a discharge end of the cartridge;
an end plate, attached to the discharge end of the cartridge, including an opening positioned above each of the outlets; and
at least two locking arms positioned around the edges of the end plate for creating a locking engagement with the coupling means.

10. The combination as claimed in claim 9, wherein the collar comprises a ledge extending into the interior thereof and the plug further comprises a protrusion extending around an exterior thereof, such that the protrusion of the plug is rotatably captured within the collar by the ledge.

11. The combination as claimed in claim 9, wherein the center plug further includes at least two keys extending parallel to the hollow male prongs, and the end plate includes mating keyways for engagement with the at least two keys.

12. The combination as claimed in claim 9, further comprising an oral tip connected to a distal end of the mixer tube.

13. The combination as claimed in claim 12, wherein the mixer tube includes a plurality of spaced rings around an outside of its distal end allowing the oral tip to be connected to the mixer tube by a pressure fit.

14. The combination as claimed in claim 12, wherein the oral tip includes serrations around a mid section thereof allowing the oral tip to bend.

15. The static mixer of claim 10, wherein the collar further includes an indentation extending around the interior thereof and having a base side even with the ledge, and the protrusion extending around the plug includes tapered sides extending inward towards an interior end of the center plug wherein the tapered sides facilitate insertion of the center plug into the collar and mating with the indentation around the interior of the collar portion.

16. A closure cap for sealing a discharge end of a cartridge having at least two materials, contained in at least two chambers, comprising:
a hollow cylindrical outer housing;
a shelf spanning an interior of the cylindrical housing separating the housing into first and second sides and, together with the housing, defining a reservoir on the first side thereof;
at least two sealing plugs adapted to engage outlets on a discharge end of the cartridge and extending from the shelf into the second side of the housing; and
at least two walled passages extending from the second side and parallel to the at least two sealing plugs, the at least two walled passages being adapted to engage keyways on the discharge end of the cartridge during shipping of the cartridge and adapted to engage outlets on the discharge end of the cartridge for parallelizing plungers within the at least two chambers.

17. The closure cap as claimed in claim 16, further comprising at least two rims each of the at least two rims being positioned around an outlet end of the at least two passages on the first side of the cylindrical housing.

* * * * *